(12) United States Patent
Zhou et al.

(10) Patent No.: US 11,553,494 B2
(45) Date of Patent: Jan. 10, 2023

(54) TECHNIQUES FOR SIGNALING A BEAM FOR PERIODIC COMMUNICATIONS

(71) Applicant: QUALCOMM Incorporated, San Diego, CA (US)

(72) Inventors: Yan Zhou, San Diego, CA (US); Tao Luo, San Diego, CA (US); Juan Montojo, San Diego, CA (US); Sony Akkarakaran, Poway, CA (US); Xiaoxia Zhang, San Diego, CA (US); Seyed Ali Akbar Fakoorian, San Diego, CA (US); Mostafa Khoshnevisan, San Diego, CA (US); Konstantinos Dimou, San Francisco, CA (US); Hamed Pezeshki, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/884,835

(22) Filed: May 27, 2020

(65) Prior Publication Data

US 2020/0413409 A1 Dec. 31, 2020

Related U.S. Application Data

(60) Provisional application No. 62/868,548, filed on Jun. 28, 2019.

(51) Int. Cl.
*H04W 72/04* (2009.01)
*H04L 1/18* (2006.01)
(Continued)

(52) U.S. Cl.
CPC ....... *H04W 72/0493* (2013.01); *H04L 1/1858* (2013.01); *H04L 5/0051* (2013.01);
(Continued)

(58) Field of Classification Search
None
See application file for complete search history.

(56) References Cited

U.S. PATENT DOCUMENTS 9,178,667 B2 11/2015 Hsu
9,402,247 B2 7/2016 Bala et al.
(Continued)

FOREIGN PATENT DOCUMENTS

| EP | 3579604 A1 | 12/2019 |
| WO | 2018129319 A1 | 7/2018 |
| WO | 2018143391 A1 | 8/2018 |

OTHER PUBLICATIONS

Huawei., et al., "UL/DL BM for Latency Reduction", 3GPP Draft, 3GPP TSG RAN WG1 Meeting #97, R1-1907530, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 13, 2019 (May 13, 2019), XP051728963, 4 Pages, Retrieved from the Internet: URL: http://www.3gpp.org/ftp/Meetings%5F3GPP%5FSYNC/RAN1/Docs/R1%2D1907530%2Ezip [retrieved on May 13, 2019] Section 2.2.2 figure 2.
(Continued)

*Primary Examiner* — Steve R Young
(74) *Attorney, Agent, or Firm* — Harrity & Harrity, LLP

(57) ABSTRACT

Various aspects of the present disclosure generally relate to wireless communication. In some aspects, a user equipment (UE) may receive a first transmission on a first beam of a set of beams in a first time period of a first transmission duration. The UE may identify a second beam of the set of beams in a second time period of the first transmission duration. The UE may transmit an indication of the identified second beam of the set of beams for an uplink trans-
(Continued)

mission and/or a downlink transmission in a second transmission duration. Numerous other aspects are provided.

30 Claims, 10 Drawing Sheets

(51) Int. Cl.
| | |
|---|---|
| *H04L 5/00* | (2006.01) |
| *H04W 72/14* | (2009.01) |
| *H04L 25/02* | (2006.01) |
| *H04W 80/02* | (2009.01) |

(52) U.S. Cl.
CPC ........ *H04L 5/0055* (2013.01); *H04L 25/0226* (2013.01); *H04W 72/046* (2013.01); *H04W 72/0413* (2013.01); *H04W 72/14* (2013.01); *H04W 80/02* (2013.01)

(56) References Cited

U.S. PATENT DOCUMENTS

| | | | | |
|---|---|---|---|---|
| 2013/0039345 | A1* | 2/2013 | Kim | H04W 72/0413 370/332 |
| 2018/0042000 | A1* | 2/2018 | Zhang | H04B 7/088 |
| 2018/0123648 | A1* | 5/2018 | Nagaraja | H04B 17/15 |
| 2018/0199226 | A1* | 7/2018 | Tsai | H04W 24/10 |
| 2019/0215701 | A1* | 7/2019 | Honglei | H04L 1/1812 |
| 2020/0052742 | A1 | 2/2020 | Islam et al. | |
| 2020/0145080 | A1* | 5/2020 | Tang | H04B 7/088 |
| 2020/0313747 | A1* | 10/2020 | Xu | H04B 7/063 |
| 2020/0344742 | A1* | 10/2020 | Chen | H04W 72/046 |
| 2020/0351036 | A1* | 11/2020 | Lee | H04L 1/188 |
| 2021/0144703 | A1* | 5/2021 | Jung | H04W 72/0413 |
| 2022/0167329 | A1* | 5/2022 | Laddu | H04L 5/0053 |

OTHER PUBLICATIONS

International Search Report and Written Opinion—PCT/US2020/034957—ISAEPO—dated Sep. 17, 2020.
3GPP TR 38.912 V14.0.0, 3rd Generation Partnership Project, Technical Specification Group Radio Access Network, Technical Report, 5G; Study on New Radio (NR) Access Technology, (Release 14), May 2017, 77 pages.
"3rd Generation Partnership Project; Technical Specification Group Radio Access Network; 5G, NR, User Equipment (UE) Radio Access Capabilities (Release 15)", 3GPP Standard; Technical Specification; 3GPP TS 38.306 version 15.5.0 Release 15, May 2019 (Oct. 3, 2018), 51 Pages.

* cited by examiner

TECHNIQUES FOR SIGNALING A BEAM FOR PERIODIC COMMUNICATIONS

CROSS-REFERENCE TO RELATED APPLICATION

This Patent Application claims priority to U.S. Provisional Patent Application No. 62/868,548, filed on Jun. 28, 2019, entitled "TECHNIQUES FOR SIGNALING A BEAM FOR PERIODIC COMMUNICATIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for signaling a beam for periodic communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a first transmission on a first beam of a set of beams in a first time period of a first transmission duration; identifying a second beam of the set of beams in a second time period of the first transmission duration; and transmitting an indication of the identified second beam of the set of beams for an uplink transmission and/or a downlink transmission in a second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, the second beam is a same beam as the first beam.

In some aspects, the second beam is a different beam than the first beam.

In some aspects, the indication identifies the second beam using a reference signal identifier associated with the second beam.

In some aspects, the indication excludes a reference signal received power parameter associated with the second beam.

In some aspects, the indication includes a reserved value, in a reference signal received power parameter field, indicating that the second beam is to be used for the uplink transmission and/or the downlink transmission in the second transmission duration.

In some aspects, the indication identifies the second beam using at least one of: a control resource set identifier associated with the second beam, a transmission configuration indication state identifier associated with the second beam, a spatial relation information identifier associated with the second beam, a sounding reference signal resource indicator associated with the second beam, or a combination thereof.

In some aspects, the indication identifies the second beam using an index that maps to at least one of: a reference signal identifier associated with the second beam, a control resource set identifier associated with the second beam, a transmission configuration indication state identifier associated with the second beam, or a combination thereof.

In some aspects, the second beam is a downlink beam for the downlink transmission, and the indication further identifies an uplink beam for the uplink transmission.

In some aspects, a method of wireless communication, performed by a UE, may include receiving a first transmission on a first beam of a set of beams in a first time period of a first transmission duration; identifying a downlink beam and an uplink beam in a second time period of the first transmission duration; and transmitting an indication of the identified downlink beam for a downlink transmission in a second transmission duration and the identified uplink beam for an uplink transmission in the second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, at least one of the downlink beam or the uplink beam is a same beam as the first beam.

In some aspects, at least one of the downlink beam or the uplink beam is a different beam than the first beam.

In some aspects, the indication is transmitted in at least one of uplink control information, a MAC-CE, or a combination thereof.

In some aspects, the indication identifies at least one of a set of downlink beams that includes the downlink beam or a set of uplink beams that includes the uplink beam.

In some aspects, the method includes indicating a beam-sweeping pattern to be used for the set of downlink beams or the set of uplink beams.

In some aspects, the beam-sweeping pattern includes at least one of a time-division multiplexing pattern, a frequency-division multiplexing pattern, a spatial-division multiplexing pattern, or a combination thereof.

In some aspects, the method includes indicating a channel for which at least one of the downlink beam or the uplink beam is to be used.

In some aspects, the method includes indicating at least one of a semi-persistent scheduling configuration or a configured grant configuration for which at least one of the downlink beam or the uplink beam is to be used.

In some aspects, the downlink beam and the uplink beam are explicitly indicated in a signaling message.

In some aspects, the downlink beam is explicitly indicated in a signaling message and the uplink beam is implicitly indicated.

In some aspects, the uplink beam is indicated by transmitting the indication on a physical uplink control channel resource that indicates the uplink beam.

In some aspects, the downlink beam is indicated by transmitting the indication on a physical uplink control channel resource that indicates the downlink beam.

In some aspects, at least one of the uplink beam or the downlink beam is indicated using at least one of: a reference signal identifier, an index that maps to the reference signal identifier, a control resource set identifier, an index that maps to the control resource set identifier, a transmission configuration indication state identifier, an index that maps to the transmission configuration indication state identifier, a spatial relation information identifier, an index that maps to the spatial relation information identifier, a sounding reference signal resource indicator, or a combination thereof.

In some aspects, a UE for wireless communication may include memory and one or more processors operatively coupled to the memory. The memory and the one or more processors may be configured to receive a first transmission on a first beam of a set of beams in a first time period of a first transmission duration; identify a second beam of the set of beams in a second time period of the first transmission duration; and transmit an indication of the identified second beam of the set of beams for an uplink transmission and/or a downlink transmission in a second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, the second beam is a same beam as the first beam.

In some aspects, the second beam is a different beam than the first beam.

In some aspects, the indication identifies the second beam using a reference signal identifier associated with the second beam.

In some aspects, the indication excludes a reference signal received power parameter associated with the second beam.

In some aspects, the indication includes a reserved value, in a reference signal received power parameter field, indicating that the second beam is to be used for the uplink transmission and/or the downlink transmission in the second transmission duration.

In some aspects, the indication identifies the second beam using at least one of: a control resource set identifier associated with the second beam, a transmission configuration indication state identifier associated with the second beam, a spatial relation information identifier associated with the second beam, a sounding reference signal resource indicator associated with the second beam, or a combination thereof.

In some aspects, the indication identifies the second beam using an index that maps to at least one of: a reference signal identifier associated with the second beam, a control resource set identifier associated with the second beam, a transmission configuration indication state identifier associated with the second beam, or a combination thereof.

In some aspects, the second beam is a downlink beam for the downlink transmission, and the indication further identifies an uplink beam for the uplink transmission.

In some aspects, a UE for wireless communication may include memory and one or more processors operatively coupled to the memory. The memory and the one or more processors may be configured to receive a first transmission on a first beam of a set of beams in a first time period of a first transmission duration; identify a downlink beam and an uplink beam in a second time period of the first transmission duration; and transmit an indication of the identified downlink beam for a downlink transmission in a second transmission duration and the identified uplink beam for an uplink transmission in the second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, at least one of the downlink beam or the uplink beam is a same beam as the first beam.

In some aspects, at least one of the downlink beam or the uplink beam is a different beam than the first beam.

In some aspects, the indication is transmitted in at least one of uplink control information, a MAC-CE, or a combination thereof.

In some aspects, the indication identifies at least one of a set of downlink beams that includes the downlink beam or a set of uplink beams that includes the uplink beam.

In some aspects, the memory and the one or more processors are configured to indicate a beam-sweeping pattern to be used for the set of downlink beams or the set of uplink beams.

In some aspects, the beam-sweeping pattern includes at least one of a time-division multiplexing pattern, a frequency-division multiplexing pattern, a spatial-division multiplexing pattern, or a combination thereof.

In some aspects, the memory and the one or more processors are configured to indicate a channel for which at least one of the downlink beam or the uplink beam is to be used.

In some aspects, the memory and the one or more processors are configured to indicate at least one of a semi-persistent scheduling configuration or a configured grant configuration for which at least one of the downlink beam or the uplink beam is to be used.

In some aspects, the downlink beam and the uplink beam are explicitly indicated in a signaling message.

In some aspects, the downlink beam is explicitly indicated in a signaling message and the uplink beam is implicitly indicated.

In some aspects, the uplink beam is indicated by transmitting the indication on a physical uplink control channel resource that indicates the uplink beam.

In some aspects, the downlink beam is indicated by transmitting the indication on a physical uplink control channel resource that indicates the downlink beam.

In some aspects, at least one of the uplink beam or the downlink beam is indicated using at least one of: a reference signal identifier, an index that maps to the reference signal identifier, a control resource set identifier, an index that maps to the control resource set identifier, a transmission configuration indication state identifier, an index that maps to the transmission configuration indication state identifier, a spatial relation information identifier, an index that maps to the spatial relation information identifier, a sounding reference signal resource indicator, or a combination thereof.

In some aspects, a non-transitory computer-readable medium may store one or more instructions for wireless communication. The one or more instructions, when executed by one or more processors of a UE, may cause the one or more processors to: receive a first transmission on a first beam of a set of beams in a first time period of a first transmission duration; identify a second beam of the set of beams in a second time period of the first transmission duration; and transmit an indication of the identified second beam of the set of beams for an uplink transmission and/or a downlink transmission in a second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, the second beam is a same beam as the first beam.

In some aspects, the second beam is a different beam than the first beam.

In some aspects, the indication identifies the second beam using a reference signal identifier associated with the second beam.

In some aspects, the indication excludes a reference signal received power parameter associated with the second beam.

In some aspects, the indication includes a reserved value, in a reference signal received power parameter field, indicating that the second beam is to be used for the uplink transmission and/or the downlink transmission in the second transmission duration.

In some aspects, the indication identifies the second beam using at least one of: a control resource set identifier associated with the second beam, a transmission configuration indication state identifier associated with the second beam, a spatial relation information identifier associated with the second beam, a sounding reference signal resource indicator associated with the second beam, or a combination thereof.

In some aspects, the indication identifies the second beam using an index that maps to at least one of: a reference signal identifier associated with the second beam, a control resource set identifier associated with the second beam, a transmission configuration indication state identifier associated with the second beam, or a combination thereof.

In some aspects, the second beam is a downlink beam for the downlink transmission, and the indication further identifies an uplink beam for the uplink transmission.

In some aspects, a non-transitory computer-readable medium may store one or more instructions for wireless communication. The one or more instructions, when executed by one or more processors of a UE, may cause the one or more processors to: receive a first transmission on a first beam of a set of beams in a first time period of a first transmission duration; identify a downlink beam and an uplink beam in a second time period of the first transmission duration; and transmit an indication of the identified downlink beam for a downlink transmission in a second transmission duration and the identified uplink beam for an uplink transmission in the second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, at least one of the downlink beam or the uplink beam is a same beam as the first beam.

In some aspects, at least one of the downlink beam or the uplink beam is a different beam than the first beam.

In some aspects, the indication is transmitted in at least one of uplink control information, a MAC-CE, or a combination thereof.

In some aspects, the indication identifies at least one of a set of downlink beams that includes the downlink beam or a set of uplink beams that includes the uplink beam.

In some aspects, the one or more instructions, when executed by the one or more processors, may cause the one or more processors to indicate a beam-sweeping pattern to be used for the set of downlink beams or the set of uplink beams.

In some aspects, the beam-sweeping pattern includes at least one of a time-division multiplexing pattern, a frequency-division multiplexing pattern, a spatial-division multiplexing pattern, or a combination thereof.

In some aspects, the one or more instructions, when executed by the one or more processors, may cause the one or more processors to indicate a channel for which at least one of the downlink beam or the uplink beam is to be used.

In some aspects, the one or more instructions, when executed by the one or more processors, may cause the one or more processors to indicate at least one of a semi-persistent scheduling configuration or a configured grant configuration for which at least one of the downlink beam or the uplink beam is to be used.

In some aspects, the downlink beam and the uplink beam are explicitly indicated in a signaling message.

In some aspects, the downlink beam is explicitly indicated in a signaling message and the uplink beam is implicitly indicated.

In some aspects, the uplink beam is indicated by transmitting the indication on a physical uplink control channel resource that indicates the uplink beam.

In some aspects, the downlink beam is indicated by transmitting the indication on a physical uplink control channel resource that indicates the downlink beam.

In some aspects, at least one of the uplink beam or the downlink beam is indicated using at least one of: a reference signal identifier, an index that maps to the reference signal identifier, a control resource set identifier, an index that maps to the control resource set identifier, a transmission configuration indication state identifier, an index that maps to the transmission configuration indication state identifier, a spatial relation information identifier, an index that maps to the spatial relation information identifier, a sounding reference signal resource indicator, or a combination thereof.

In some aspects, an apparatus for wireless communication may include means for receiving a first transmission on a first beam of a set of beams in a first time period of a first transmission duration; means for identifying a second beam of the set of beams in a second time period of the first transmission duration; and means for transmitting an indication of the identified second beam of the set of beams for an uplink transmission and/or a downlink transmission in a second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, the second beam is a same beam as the first beam.

In some aspects, the second beam is a different beam than the first beam.

In some aspects, the indication identifies the second beam using a reference signal identifier associated with the second beam.

In some aspects, the indication excludes a reference signal received power parameter associated with the second beam.

In some aspects, the indication includes a reserved value, in a reference signal received power parameter field, indicating that the second beam is to be used for the uplink transmission and/or the downlink transmission in the second transmission duration.

In some aspects, the indication identifies the second beam using at least one of: a control resource set identifier associated with the second beam, a transmission configuration indication state identifier associated with the second beam, a spatial relation information identifier associated with the second beam, a sounding reference signal resource indicator associated with the second beam, or a combination thereof.

In some aspects, the indication identifies the second beam using an index that maps to at least one of: a reference signal identifier associated with the second beam, a control resource set identifier associated with the second beam, a transmission configuration indication state identifier associated with the second beam, or a combination thereof.

In some aspects, the second beam is a downlink beam for the downlink transmission, and the indication further identifies an uplink beam for the uplink transmission.

In some aspects, an apparatus for wireless communication may include means for receiving a first transmission on a first beam of a set of beams in a first time period of a first transmission duration; means for identifying a downlink beam and an uplink beam in a second time period of the first transmission duration; and means for transmitting an indication of the identified downlink beam for a downlink transmission in a second transmission duration and the identified uplink beam for an uplink transmission in the second transmission duration.

In some aspects, the set of beams are used to receive a set of retransmissions in the second time period based at least in part on indicating that the first transmission failed.

In some aspects, indicating that the first transmission failed includes transmitting a NACK corresponding to the first transmission or refraining from transmitting an ACK or NACK feedback corresponding to the first transmission.

In some aspects, the first transmission duration and the second transmission duration are configured according to a periodicity associated with a semi-persistent scheduling configuration or a configured grant configuration.

In some aspects, the first time period is an initial transmission window and the second time period is a retransmission window.

In some aspects, at least one of the downlink beam or the uplink beam is a same beam as the first beam.

In some aspects, at least one of the downlink beam or the uplink beam is a different beam than the first beam.

In some aspects, the indication is transmitted in at least one of uplink control information, a MAC-CE, or a combination thereof.

In some aspects, the indication identifies at least one of a set of downlink beams that includes the downlink beam or a set of uplink beams that includes the uplink beam.

In some aspects, the apparatus may include means for indicating a beam-sweeping pattern to be used for the set of downlink beams or the set of uplink beams.

In some aspects, the beam-sweeping pattern includes at least one of a time-division multiplexing pattern, a frequency-division multiplexing pattern, a spatial-division multiplexing pattern, or a combination thereof.

In some aspects, the apparatus may include means for indicating a channel for which at least one of the downlink beam or the uplink beam is to be used.

In some aspects, the apparatus may include means for indicating at least one of a semi-persistent scheduling configuration or a configured grant configuration for which at least one of the downlink beam or the uplink beam is to be used.

In some aspects, the downlink beam and the uplink beam are explicitly indicated in a signaling message.

In some aspects, the downlink beam is explicitly indicated in a signaling message and the uplink beam is implicitly indicated.

In some aspects, the uplink beam is indicated by transmitting the indication on a physical uplink control channel resource that indicates the uplink beam.

In some aspects, the downlink beam is indicated by transmitting the indication on a physical uplink control channel resource that indicates the downlink beam.

In some aspects, at least one of the uplink beam or the downlink beam is indicated using at least one of: a reference signal identifier, an index that maps to the reference signal identifier, a control resource set identifier, an index that maps to the control resource set identifier, a transmission configuration indication state identifier, an index that maps to the transmission configuration indication state identifier, a spatial relation information identifier, an index that maps to the spatial relation information identifier, a sounding reference signal resource indicator, or a combination thereof.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
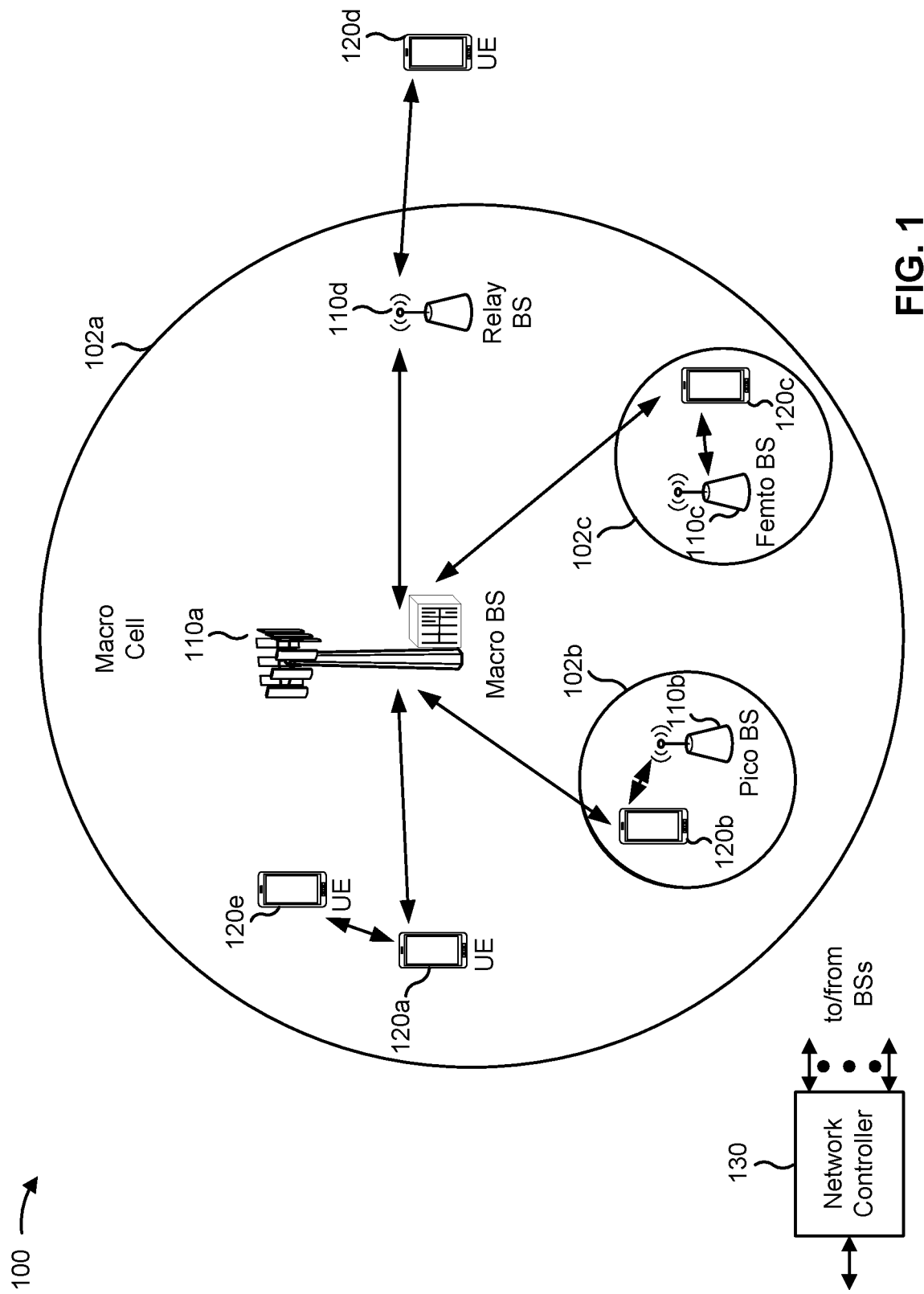
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
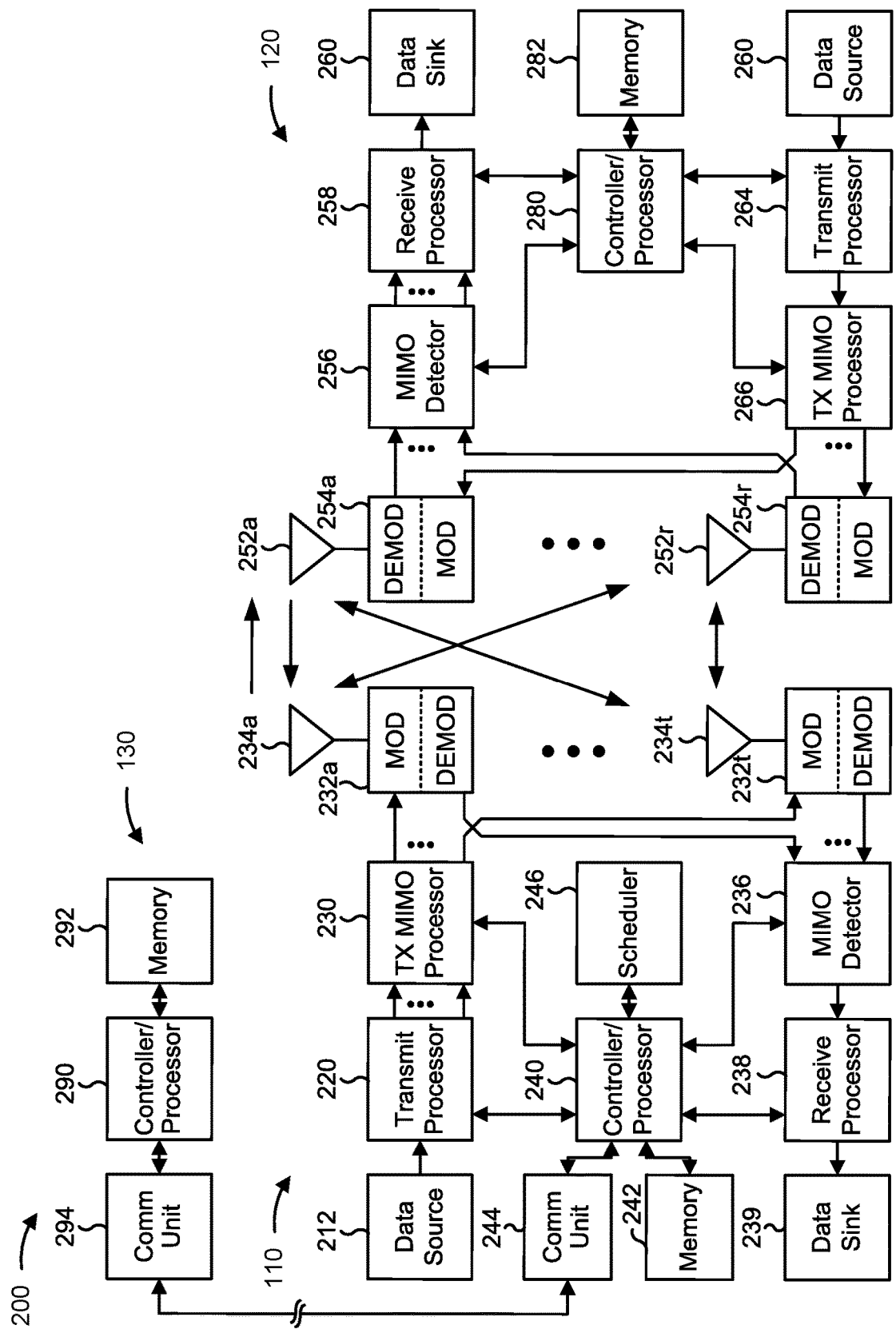
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling a beam for periodic communications, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 700 of FIG. 7, process 800 of FIG. 8, and/or other processes as described herein. A scheduler 246 may schedule UEs for data transmission on the downlink and/or uplink.

In some aspects, UE 120 may include means for receiving a first transmission on a first beam of a set of beams in a first time period of a first transmission duration; means for identifying a second beam of the set of beams in a second time period of the first transmission duration; means for transmitting an indication of the identified second beam of the set of beams for an uplink transmission and/or a downlink transmission in a second transmission duration; and/or the like. Additionally, or alternatively, UE 120 may include means for receiving a first transmission on a first beam of a set of beams in a first time period of a first transmission duration; means for identifying a downlink beam and an uplink beam in a second time period of the first transmission duration; means for transmitting an indication of the identified downlink beam for a downlink transmission in a second transmission duration and the identified uplink beam for an uplink transmission in the second transmission duration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
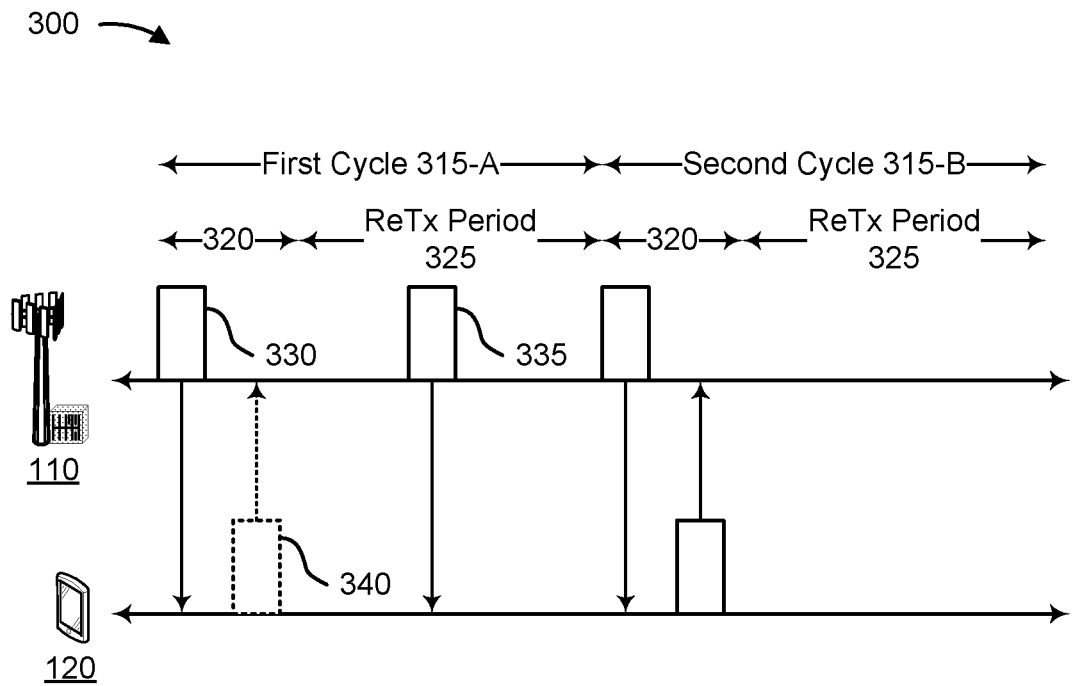
FIG. 3 is a diagram illustrating an example of using beams for periodic communications, in accordance with various aspects of the present disclosure.
Figure 3:
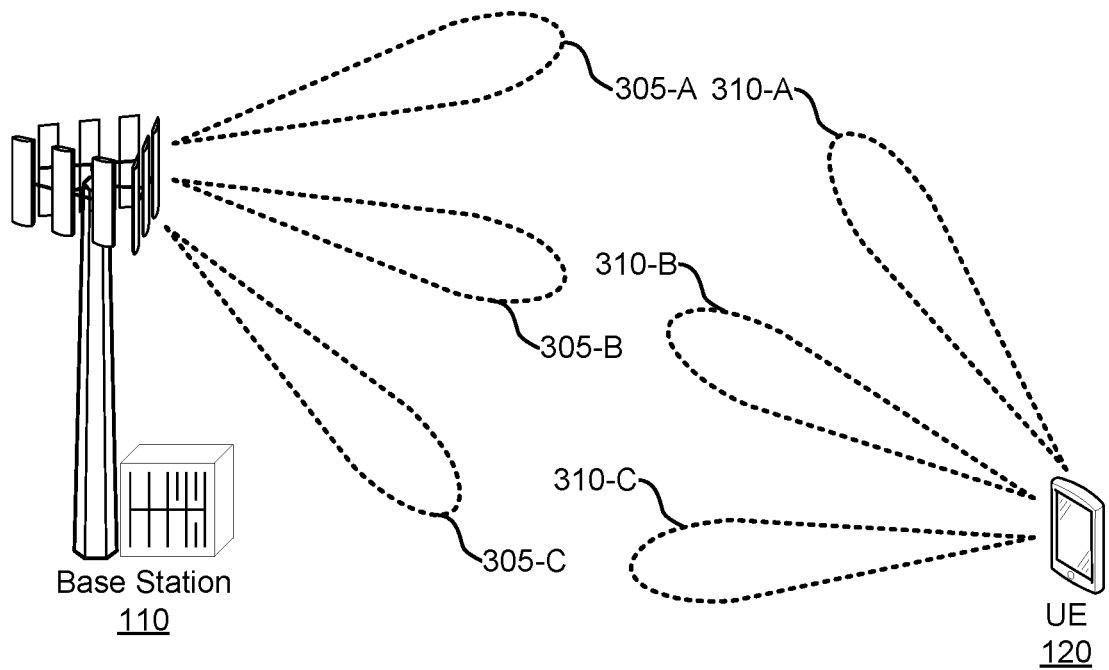

FIG. 3 is a diagram illustrating an example 300 of using beams for periodic communications, in accordance with various aspects of the present disclosure.

As shown in FIG. 3, a UE 120 and a base station 110 may communicate using beamformed transmissions. For example, the base station 110 may directionally transmit and/or monitor using one or more beams 305 (shown as beams 305-A, 305-B, and 305-C), and the UE 120 may directionally transmit and/or monitor using one or more beams 310 (shown as beams 310-A, 310-B, and 310-C). A downlink beam may be used for communications from the base station 110 to the UE 120, and an uplink beam may be used for communications from the UE 120 to the base station 110. A beam may include a transmit beam, a receive beam, and/or the like.

The base station 110 and the UE 120 may support configurations for periodic communications, such as semi-persistent scheduling (SPS) communications, configured grant (CG) communications, and/or the like. For SPS communications, the base station 110 and the UE 120 may be configured with periodic resources (e.g., time resources, frequency resources, spatial resources, and/or the like) for downlink transmissions. The resources may be configured in a radio resource control (RRC) message or a similar type of message that includes an SPS configuration. In this case, the base station 110 does not need to transmit a downlink grant (e.g., in downlink control information (DCI), a physical downlink control channel (PDCCH), and/or the like) to allocate resources to the UE 120 for downlink transmissions (e.g., initial downlink transmissions), thereby reducing latency and conserving network resources. In some aspects, downlink grants may be used for retransmissions in SPS.

For CG communications, a base station 110 and a UE 120 may be configured with periodic resources for uplink transmissions. Similar to SPS communications, the resources may be configured in an RRC message or a similar type of message that includes a CG configuration. In this case, the UE 120 does not need to request and the base station 110 does not need to transmit an uplink grant (e.g., in DCI, a PDCCH, and/or the like) to allocate resources to the UE 120 for uplink transmissions, thereby reducing latency and conserving network resources. In some aspects, uplink grants may be used for retransmissions in CG.

As shown in FIG. 3, a wireless communication device (e.g., a base station 110, a UE 120, and/or the like) may be configured with periodic resources based at least in part on a recurring transmission cycle 315 (e.g., a transmission duration), shown as a first transmission cycle 315-A (e.g., a first transmission duration) and a second transmission cycle 315-B (e.g., a second transmission duration). The duration (e.g., length) and timing of a transmission cycle may be configured according to a periodic communication configuration, such as an SPS configuration, a CG configuration, and/or the like. For example, a transmission cycle duration or length may correspond to a periodicity of an SPS configuration, a CG configuration, and/or the like.

As further shown, a transmission cycle 315 may include a first time period 320 and a second time period 325. The first time period may be referred to as an initial transmission window. The second time period may be referred to as a retransmission window. In this case, the base station 110 (e.g., for SPS) or the UE 120 (e.g., for CG) may transmit an initial transmission in the first time period 320 of the transmission cycle 315, and the base station 110 (e.g., for SPS) or the UE 120 (e.g., for CG) may transmit one or more retransmissions in the second time period 325 of the transmission cycle 315. In some cases, the one or more retransmissions may be transmitted regardless of whether the initial transmission was successful (e.g., to improve reliability using repetitions of the initial transmission). In other cases, the one or more retransmissions may be transmitted only if the initial transmission was not successful (e.g., if a negative acknowledgement (NACK) is transmitted or received for the initial transmission). The initial transmission window and the retransmission window may occur in a transmission cycle 315 (e.g., transmission cycle 315-A) prior to occurrence of a next consecutive transmission cycle 315 (e.g., transmission cycle 315-B). In some aspects, initial transmissions in an initial transmission window may be scheduled in an RRC message (e.g., according to an SPS configuration and/or a CG configuration), without using DCI to schedule the initial transmissions (although activation DCI may be used to activate or deactivate the initial transmissions). In some aspects, retransmissions in a retransmission window may be scheduled using DCI.

For example, using SPS, the base station 110 may transmit a periodic downlink communication, such as a physical downlink shared channel (PDSCH) communication 330, to the UE 120 within a first time period 320 of a first transmission cycle 315-A, as shown. If the PDSCH communication 330 fails, then the base station 110 may retransmit the PDSCH communication, shown as a retransmission 335, in the second time period 325 of a first transmission cycle 315-A, as shown. In some aspects, the UE 120 may transmit (and the base station 110 may receive) a NACK 340, corresponding to the PDSCH communication 330, to indicate that the PDSCH communication 330 has failed. Alternatively, the UE 120 may not transmit an acknowledgement (ACK) or a NACK (e.g., may refrain from transmitting ACK or NACK (ACK/NACK) feedback) corresponding to the PDSCH communication 330, thereby indicating that the PDSCH communication 330 has failed.

As another example, using CG, the UE 120 may transmit a periodic uplink communication, such as a physical uplink shared channel (PUSCH) communication (not shown), to the base station 110 within a first time period 320 of a first transmission cycle 315-A. If the PUSCH communication fails, then the UE 120 may retransmit the PUSCH communication (e.g., a retransmission) in the second time period 325 of the first transmission cycle 315-A. In some aspects, the base station 110 may transmit (and the UE 120 may receive) a NACK, corresponding to the PUSCH communication, to indicate that the PUSCH communication has failed. Alternatively, the base station 110 may not transmit an ACK or a NACK (e.g., may refrain from transmitting ACK/NACK feedback) corresponding to the PUSCH communication, indicating that the PUSCH communication has failed.

In some aspects, periodic communications, such as SPS communications and/or CG communications, may be transmitted or received using beamforming. For example, the base station 110 may transmit a PDSCH communication to the UE 120 using a first beam 305-B, and the UE 120 may monitor for the transmission using a corresponding first beam 310-B. In some cases, a beam (or beam pair) used for periodic communications may be updated. For example, if a periodic transmission from the base station 110 using the first beam 305-B fails, then the active beam used for downlink periodic transmissions may be updated to another beam, such as a second beam 305-A. The second beam 305-A may have a stronger signal strength at the UE 120 than the first beam 305-B.

In some cases, a base station 110 may select a new beam for periodic communications with a UE 120. For example, if a retransmission on the new beam is successful, then the base station 110 may update the beam for the next transmission cycle by transmitting DCI to the UE 120. The DCI may indicate the new beam to the UE 120. The UE 120 may then decode the DCI, identify the new beam indicated by the DCI, and use the new beam for periodic transmissions in the next cycle 315. However, transmission of the DCI and decoding of the DCI may cause latency for the beam update.

Some techniques and apparatuses described herein permit the UE 120 to select the new beam instead of waiting for the base station 110 to transmit DCI indicating the new beam. This may enable the UE 120 to switch to a more reliable or higher quality beam more quickly than if the base station 110 were to select the new beam, thereby reducing latency and improving communication quality and reliability.

As indicated above, FIG. 3 is provided as an example. Other examples may differ from what is described with regard to FIG. 3.

Figure 4:
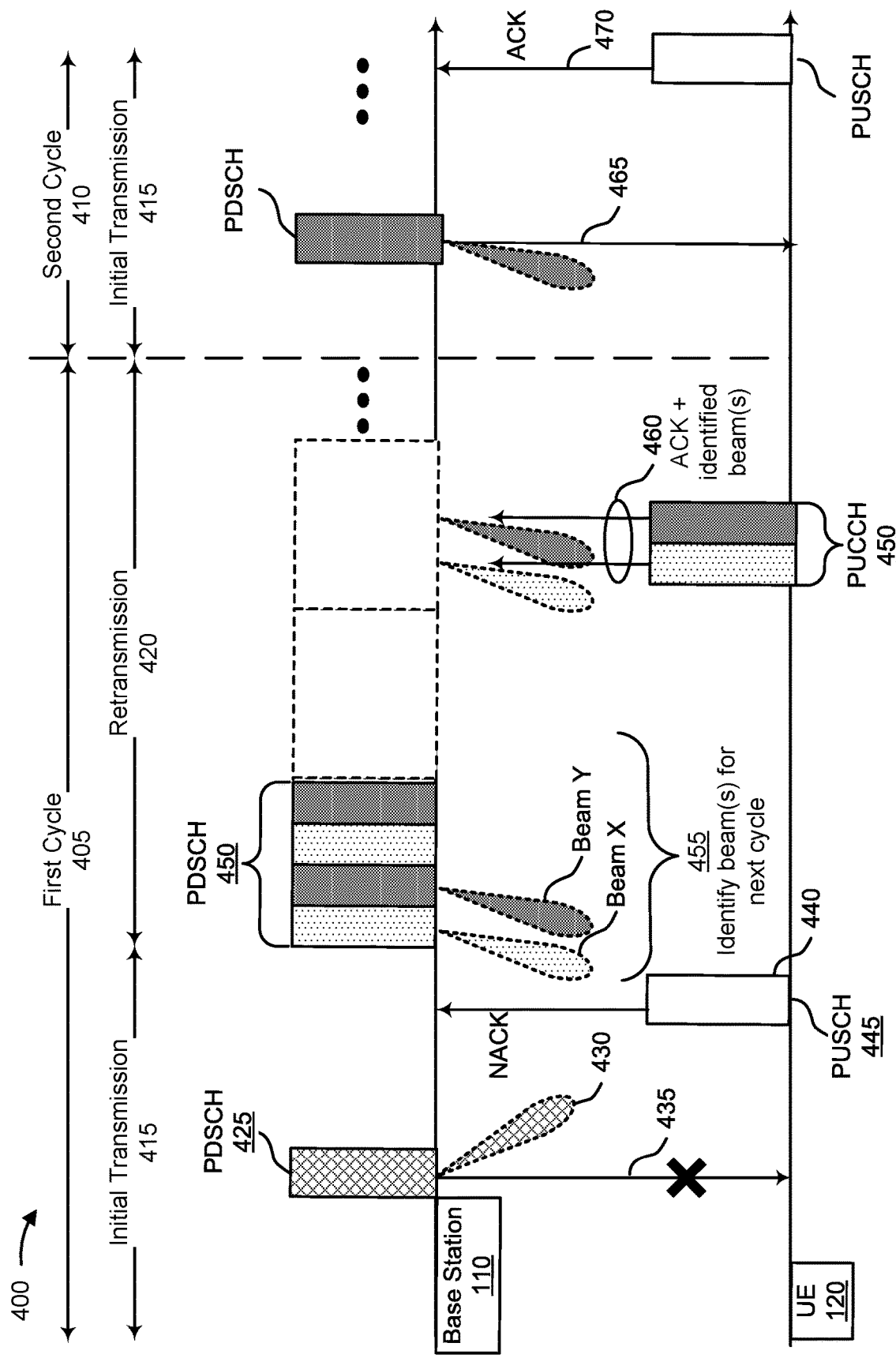
FIG. 4 is a diagram illustrating an example of signaling a beam for periodic communications, in accordance with various aspects of the present disclosure.

FIG. 4 is a diagram illustrating an example 400 of signaling a beam for periodic communications, in accordance with various aspects of the present disclosure. As shown in FIG. 4, a base station 110 and a UE 120 may communicate with one another.

As described above in connection with FIG. 3, the base station 110 and the UE 120 may support periodic communications (e.g., SPS communications, CG communications, and/or the like), and may be configured with periodic resources for the periodic communications. The periodic resources may be configured in recurring transmission cycles (e.g., recurring transmission durations) as described above in connection with FIG. 3, shown in FIG. 4 as a first cycle 405 (e.g., a first transmission duration) and a second cycle 410 (e.g., a second transmission duration). A transmission cycle may include a first time period, shown as an initial transmission window 415, and a second time period, shown as a retransmission window 420. The base station 110 (e.g., for SPS) or the UE 120 (e.g., for CG) may transmit an initial transmission in the initial transmission window 415 of a transmission cycle, and the base station 110 (e.g., for SPS) or the UE 120 (e.g., for CG) may transmit one or more retransmissions in the retransmission window 420 of the transmission cycle.

As shown by reference number 425, using SPS, the base station 110 may transmit an initial PDSCH communication to the UE 120 within the initial transmission window 415 of the first cycle 405. As shown by reference number 430, the base station 110 may transmit, and the UE 120 may receive, the initial PDSCH communication using a first beam. The first beam may include a downlink transmit (TX) beam of the base station 110 and/or a corresponding downlink receive (RX) beam of the UE 120. In some aspects, the first beam may be included in a set of beams configured as candidates for communication between the UE 120 and the base station 110.

As shown by reference number 435, the initial PDSCH communication may fail. For example, the UE 120 may fail to successfully receive and/or decode the initial PDSCH communication. As shown by reference number 440, the UE 120 may indicate, to the base station 110, that the initial PDSCH communication has failed. In some aspects, the UE 120 may indicate that the initial PDSCH communication has failed by transmitting a NACK corresponding to the initial PDSCH communication. For example, as shown by reference number 445, the UE 120 may transmit the NACK in a PUSCH communication. In this case, the base station 110 may determine that the initial PDSCH communication has failed based at least in part on receiving the NACK. In some aspects, the UE 120 may indicate that the initial PDSCH communication has failed by refraining from transmitting ACK/NACK feedback corresponding to the initial PDSCH communication. In this case, the base station 110 may determine that the initial PDSCH communication has failed based at least in part on failing to receive ACK/NACK feedback corresponding to the initial PDSCH communication.

As shown by reference number 450, based at least in part on determining that the initial PDSCH communication on the first beam has failed, the base station 110 may retransmit the initial PDSCH communication on a set of beams, shown as Beam X and Beam Y. For example, the base station 110 may retransmit the PDSCH communication on a set of beams configured as candidates for communication between the UE 120 and the base station 110. As shown, the retransmissions may occur in the retransmission window 420 of the first cycle 405. In some aspects, resources for periodic communications in the initial transmission window 415 may be allocated using a configuration (e.g., in an RRC message) without using DCI. In some aspects, resources for retransmissions of periodic communications may be allocated using DCI, such as DCI carried in a PDCCH.

As shown by reference number 455, the UE 120 may identify a second beam, of the set of beams, in the retransmission window 420 of the first cycle 405. For example, the UE 120 may monitor for PDSCH communications on the set of beams (e.g., according to information in DCI). The UE 120 may measure one or more beam parameters for each beam of the set of beams, such as a reference signal received power (RSRP) parameter, a reference signal received quality (RSRQ) parameter, a signal-to-interference-plus-noise ratio (SINR), and/or the like. The UE 120 may identify a beam with the best beam parameter(s) as the second beam.

As shown by reference number 460, the UE 120 may transmit an ACK when a retransmission is successfully received (e.g., on a single beam or due to combining of retransmissions from multiple beams). Additionally, or alternatively, the UE 120 may transmit an indication that identifies the second beam (e.g., using a beam index and/or the like). The indication may be transmitted in uplink control information (UCI), in a physical uplink control channel (PUCCH) communication, in connection with the ACK, in a MAC-CE, and/or the like.

In some aspects, the UE 120 may identify the second beam using a reference signal identifier associated with the second beam. For example, the base station 110 may transmit a reference signal, such as a channel state information reference signal (CSI-RS) and/or the like, for each beam in the set of beams. Each reference signal may include or be associated with a reference signal identifier (e.g., a CSI-RS ID). The UE 120 may indicate the second beam (e.g., a beam selected by the UE 120 from the set of beams) to the base station 110 by indicating the reference signal identifier. In some cases, such as when the base station 110 selects a beam, the UE 120 may indicate a reference signal identifier for a beam and a corresponding RSRP measured for the beam. However, in this case, where the UE 120 selects the second beam, the UE 120 may exclude an RSRP parameter when indicating the second beam to the base station 110. Alternatively, the UE 120 may transmit a reserved value in an RSRP parameter field in association with the reference signal identifier. The reserved value (e.g., all zeros, all ones, a combination of zeros and ones, and/or the like) may indicate that the second beam is to be used in the second transmission cycle.

In some aspects, the UE 120 may identify the second beam using a control resource set (CORESET) identifier associated with the second beam. For example, different CORESETs (e.g., in a bandwidth) part may be associated with different beams. Thus, by indicating a CORESET identifier associated with the second beam, the UE 120 may uniquely identify the second beam. Additionally, or alternatively, the UE 120 may identify the second beam using a transmission configuration indication (TCI) state associated with the second beam, a spatial relation information identifier associated with the second beam, a sounding reference signal (SRS) resource indicator associated with the second beam, and/or the like.

In some aspects, the UE 120 may identify the second beam using an index. The index may map to a reference signal identifier associated with the second beam, a CORESET identifier associated with the second beam, a TCI state associated with the second beam, a spatial relation information identifier, and/or the like. For example, one or more of the values described above may be indexed or down-selected using a set of index values so that the value can be indicated using fewer bits, thereby conserving network resources and reducing signaling overhead. In some aspects, the mapping of index values to corresponding identifiers may be transmitted in an RRC message, a MAC-CE, and/or the like. In some aspects, a set of values that can be used by the UE 120 to identify the second beam may include a reserved value that indicates that the same beam that was used in the first cycle 405 (e.g., the first beam used for initial transmission of the PDSCH communication) is to be used again in the second cycle 410. Thus, in some aspects, the second beam, indicated by the UE 120 to the base station 110, may be the same as the first beam. The other, non-reserved values may indicate a second beam that is different from the first beam.

In some aspects, the second beam may be a downlink beam. In this case, the base station 110 may use the indicated second beam for an initial PDSCH transmission in the second cycle 410, as shown by reference number 465. Alternatively, the second beam may be an uplink beam. In this case, the UE 120 may use the second beam for an initial PUSCH communication in the second cycle 410, and the base station 110 may monitor for the initial PUSCH communication in the second cycle 410 using the second beam. In example 400, the UE 120 identifies Beam Y as the best beam and indicates Beam Y to the base station 110. The base station 110 then transmits a PDSCH communication in the second cycle 410 (e.g., an initial transmission window of the second cycle 410) using Beam Y. As shown by reference number 470, because the UE 120 indicated a better beam for the second cycle 410, the UE 120 successfully receives the PDSCH communication and transmits an ACK corresponding to the PDSCH communication (e.g., in the PUSCH). Although FIG. 4 shows operations associated with SPS, similar operations may occur in CG.

In some aspects, the UE 120 may indicate multiple beams (e.g., a set of second beams) rather than a single beam. In some aspects, the UE 120 may indicate a beam-sweeping pattern to be used for the multiple beams. For example, the UE 120 may indicate a list of beams (e.g., a prioritized list), and an order of beams in the list may indicate a beam-sweeping pattern for the beams. The beam-sweeping pattern may indicate a first set of resources (e.g., time resources, frequency resources, spatial resources, and/or the like) to be used for a first beam, a second set of resources to be used for a second beam, and/or the like. The base station 110 may use the first set of resources for the first beam (e.g., in the initial transmission window of the second cycle 410), may use the second set of resources for the second beam (e.g., in the initial transmission window of the second cycle 410), and so on. For example, the beam-sweeping pattern may indicate a time-division multiplexing (TDM) pattern, a frequency-division multiplexing (FDM) pattern, a spatial-division multiplexing (SDM) pattern, and/or the like. In this way, transmit diversity may be achieved.

In some aspects, a TDM pattern may configure a downlink transmission and/or an uplink transmission via different beam pair links at different time allocations. In some aspects, the different time allocations correspond to different slots, different mini-slots, and/or the like. In some aspects, the FDM pattern may configure a downlink transmission and/or an uplink transmission via different beam pair links at different frequency allocations. In some aspects, the SDM pattern may configure a downlink transmission and/or an uplink transmission via different beam pair links simultaneously at overlapped allocations in time and frequency.

Additionally, or alternatively, the UE 120 may indicate a channel for which the second beam is to be used. In this case, the base station 110 and/or the UE 120 may use the second beam to transmit communications on the indicated channel. The channel may include, for example, a PDCCH, a PUCCH, a PDSCH (e.g., a DCI and/or SPS-based PDSCH), a PUSCH (e.g., a DCI and/or CG-based PUSCH), a physical random access channel (PRACH), a default PDSCH beam (e.g., when a scheduling offset is less than a threshold for beam switch latency such that there is not enough time to switch beams before the next scheduled PDSCH communication), and/or the like.

Additionally, or alternatively, the UE 120 may indicate a periodic communication configuration (e.g., an SPS configuration, a CG configuration, and/or the like) for which the second beam is to be used. For example, the UE 120 and/or the base station 110 may be configured with multiple SPS configurations, multiple CG configurations, and/or the like. In this case, the UE 120 may indicate an SPS configuration and/or a CG configuration for which the second beam is to be used, such as by using an index or identifier that identifies the SPS configuration and/or the CG configuration.

In some aspects, the UE 120 may indicate both a downlink beam and an uplink beam, as described in more detail below in connection with FIGS. 5 and 6. By permitting the UE 120 to select the new beam instead of waiting for the base station 110 to transmit DCI indicating the new beam, the UE 120 may be able to switch to a more reliable or higher quality beam more quickly than if the base station 110 were to select the new beam, thereby reducing latency and improving communication quality and reliability.

As indicated above, FIG. 4 is provided as an example. Other examples may differ from what is described with regard to FIG. 4.

Figure 5:
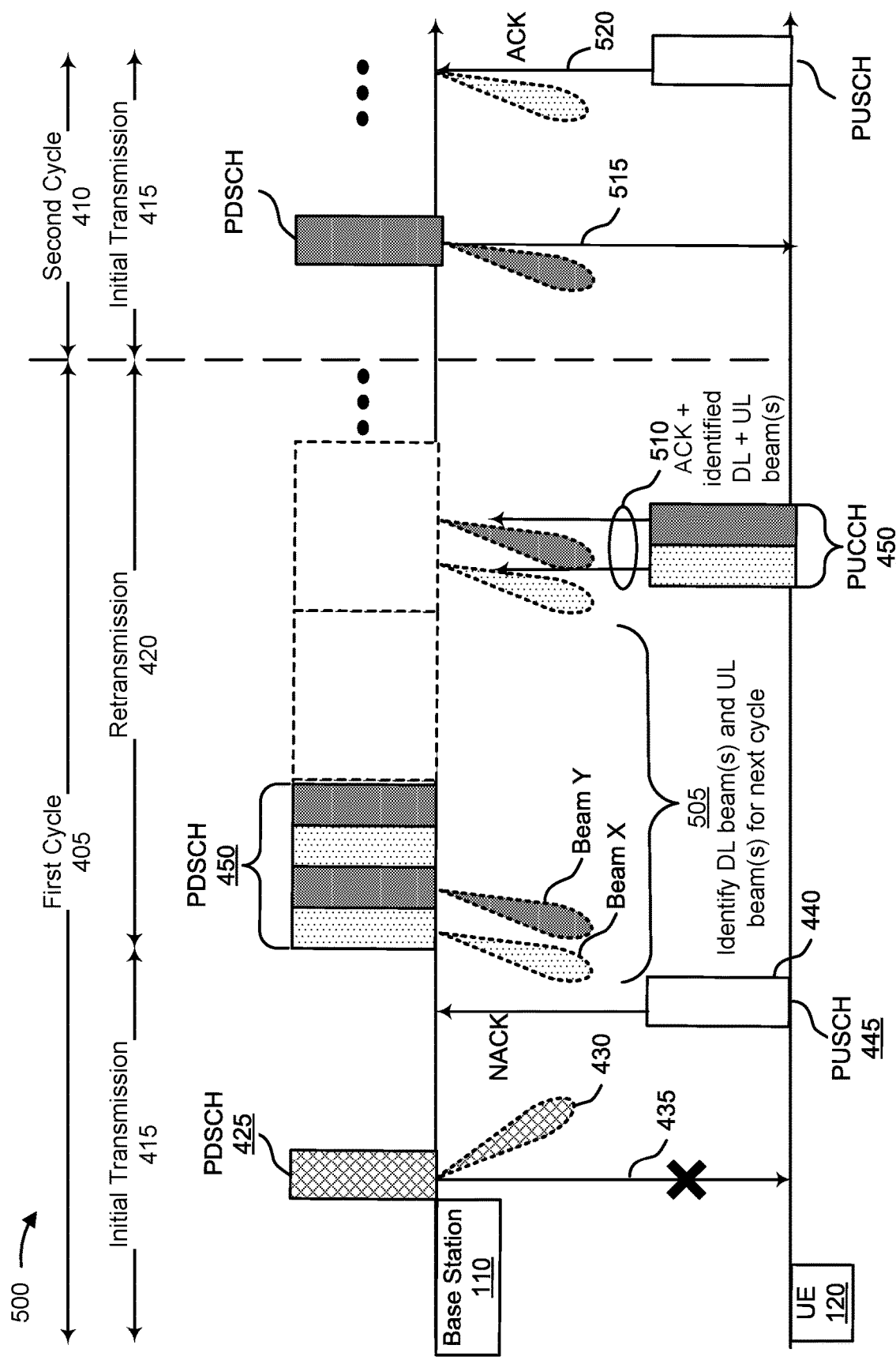
FIG. 5 is a diagram illustrating another example of signaling a beam for periodic communications, in accordance with various aspects of the present disclosure.

FIG. 5 is a diagram illustrating another example 500 of signaling a beam for periodic communications, in accordance with various aspects of the present disclosure.

FIG. 5 shows similar operations as FIG. 4, except that at 505, the UE 120 may identify a downlink beam and an uplink beam in the retransmission window 420 of the first cycle 405. In some aspects, the UE 120 may determine the uplink beam based at least in part on measuring downlink beams. For example, there may be beam correspondence in a beam pair link that includes an uplink beam and a downlink beam, and the UE 120 may select an uplink beam that is in a beam pair link with the best measured downlink beam. Alternatively, the uplink beam may not be in the same beam pair link as the best downlink beam, such as when an uplink beam in a same beam pair link as the best downlink beam is subject to maximum permissible exposure (MPE) constraint. In this case, the UE 120 may select the best uplink beam that satisfies the MPE constraint.

As shown by reference number 510, the UE 120 may transmit an indication that identifies the downlink beam and the uplink beam, in a similar manner as described above in FIG. 4 in connection with transmitting an indication that identifies the second beam. For example, the UE 120 may transmit the indication of the uplink beam and the downlink beam in UCI, in a MAC-CE, in a PUCCH communication, in connection with an ACK corresponding to the initial PDSCH communication, and/or the like. Additionally, or alternatively, the UE 120 may transmit the indication of the uplink beam and the downlink beam using a reference signal identifier, an index that maps to the reference signal identifier, a CORESET identifier, an index that maps to the CORESET identifier, a TCI state identifier, an index that maps to the TCI state identifier, a spatial relation information identifier, an index that maps to the spatial relation information identifier, an SRS resource indicator, and/or the like. In some aspects, at least one of the downlink beam or the uplink beam is a same beam as the first beam (e.g., is included in the same beam pair link as the first beam). In some aspects, at least one of the downlink beam or the uplink beam is a different beam than the first beam (e.g., is included in a different beam pair link than the first beam).

As shown by reference number 515, the base station 110 may use a downlink beam indicated by the UE 120 to transmit an initial PDSCH communication in the second cycle 410 (e.g., in the initial transmission window). As shown by reference number 520, the UE 120 may use an uplink beam indicated by the UE 120 to transmit an initial PUSCH communication in the second cycle 410 (e.g., in the initial transmission window). In example 500, the UE 120 identifies Beam Y as the best downlink beam and Beam X as the best uplink beam and indicates Beam Y and Beam X to the base station 110. The base station 110 transmits a PDSCH communication in the second cycle 410 (e.g., an initial transmission window of the second cycle 410) using Beam Y. The UE 120 transmits a PUSCH communication in the second cycle 410 (e.g., an initial transmission window of the second cycle 410) using Beam X.

As described above in connection with FIG. 4, in some aspects, the UE 120 may indicate multiple beams rather than a single beam. For example, the UE 120 may indicate multiple downlink beams and/or multiple uplink beams. In some aspects, the UE 120 may indicate a beam-sweeping pattern to be used for the multiple downlink beams and/or the multiple uplink beams, in a similar manner as described above in connection with FIG. 4. Additionally, or alternatively, the UE 120 may indicate a channel for which an uplink beam and/or a downlink beam is to be used, in a similar manner as described above in connection with FIG. 4. Additionally, or alternatively, the UE 120 may indicate a periodic communication configuration (e.g., an SPS configuration, a CG configuration, and/or the like) for which an uplink beam and/or a downlink beam is to be used, in a similar manner as described above in connection with FIG. 4.

In some aspects, the UE 120 may explicitly indicate an uplink beam and/or a downlink beam in a signaling message (e.g., UCI, a MAC-CE, a PUCCH communication, and/or the like). For example, the UE 120 may transmit the signaling message, and the signaling message may include a first value that indicates a downlink beam (or a set of downlink beams) and/or a second value that indicates an uplink beam (or a set of uplink beams). In some aspects, the signaling message may include both the first value and the second value to explicitly indicate both the downlink beam and the uplink beam. Alternatively, the signaling message may include a value that jointly indicates the downlink beam and the uplink beam. In some aspects, the UE 120 may implicitly indicate a beam (e.g., an uplink beam or a downlink beam), such as by excluding a value that identifies the beam in the signaling message, as described below in connection with FIG. 6.

As indicated above, FIG. 5 is provided as an example. Other examples may differ from what is described with regard to FIG. 5.

Figure 6:
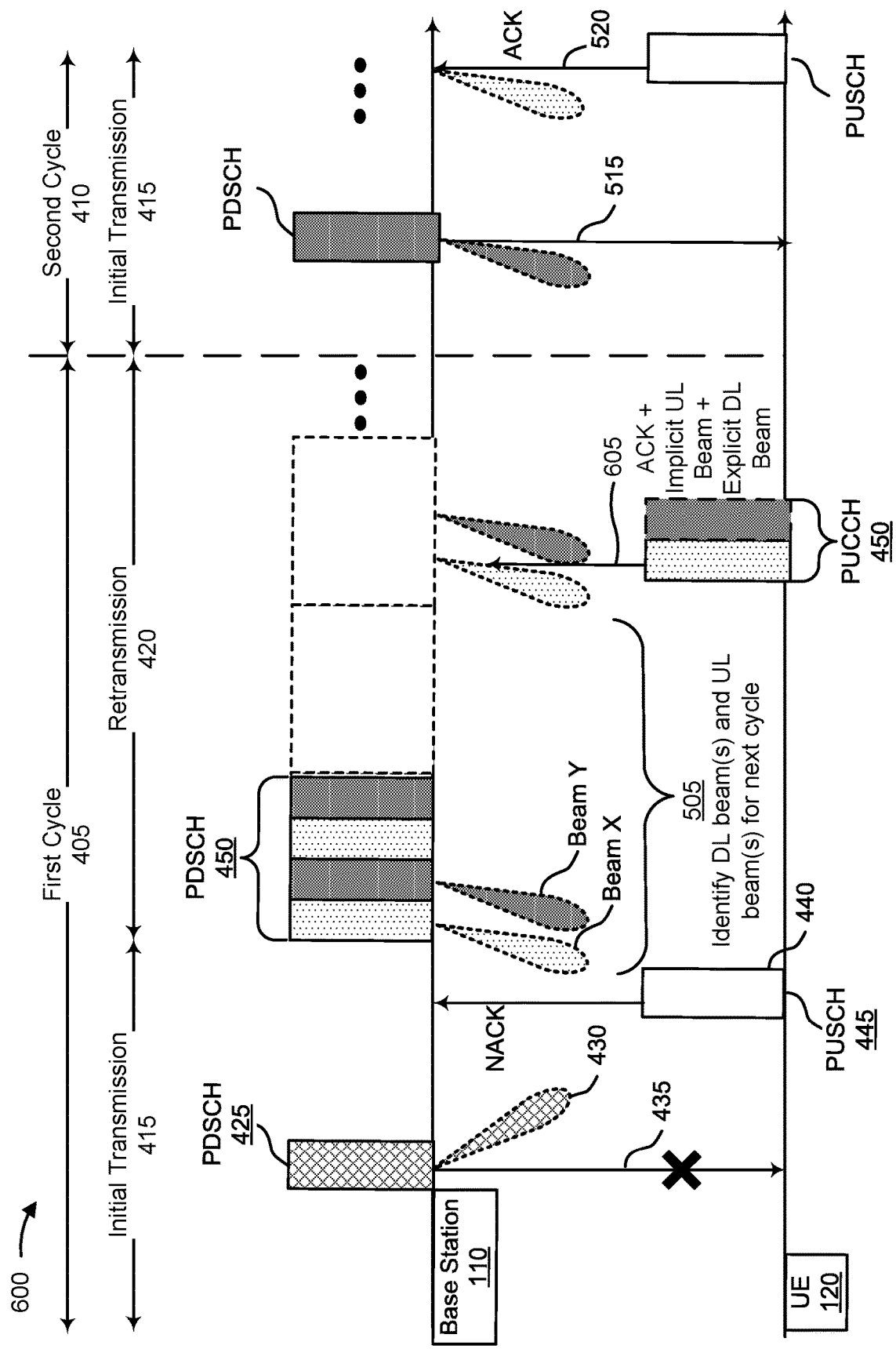
FIG. 6 is a diagram illustrating another example of signaling a beam for periodic communications, in accordance with various aspects of the present disclosure.

FIG. 6 is a diagram illustrating another example 600 of signaling a beam for periodic communications, in accordance with various aspects of the present disclosure.

FIG. 6 shows similar operations as FIG. 5, except that at 605, the UE 120 may implicitly indicate one or more beams (e.g., an uplink beam, a downlink beam, or both an uplink beam and a downlink beam). In FIG. 6, the UE 120 explicitly indicates a downlink beam (e.g., in a signaling message) and implicitly indicates an uplink beam. For example, the UE 120 may implicitly indicate the uplink beam by transmitting the indication (e.g., an ACK and/or a signaling message) in a PUCCH resource (e.g., a time resource, a frequency resource, a spatial resource, and/or the like) that indicates the uplink beam.

For example, a first PUCCH resource may correspond to a first beam, a second PUCCH resource may correspond to a second beam, and so on. By transmitting on a first PUCCH resource and refraining from transmitting on a second PUCCH resource (and all other PUCCH resources other than the first PUCCH resource), the UE 120 may implicitly indicate the first beam. In some aspects, the PUCCH resource is a beam used for transmission by the UE 120. In this case, the beam used for transmission is the beam to be used in the next transmission cycle. The base station 110 may monitor all PUCCH resources, may identify a PUCCH resource used by the UE 120 for a transmission, and may identify a beam corresponding to the identified PUCCH resource.

In example 600, the UE 120 identifies Beam Y as the best downlink beam and Beam X as the best uplink beam. The UE 120 transmits, in a PUCCH resource that implicitly indicates Beam X, an ACK and an indication of Beam Y as the downlink beam. The base station 110 transmits a PDSCH communication in the second cycle 410 (e.g., an initial transmission window of the second cycle 410) using Beam Y. The UE 120 transmits a PUSCH communication in the second cycle 410 (e.g., an initial transmission window of the second cycle 410) using Beam X, in a similar manner as described above in connection with FIG. 5. In this way, a beam may be indicated with reduced signaling overhead.

As indicated above, FIG. 6 is provided as an example. Other examples may differ from what is described with regard to FIG. 6.

Figure 7:
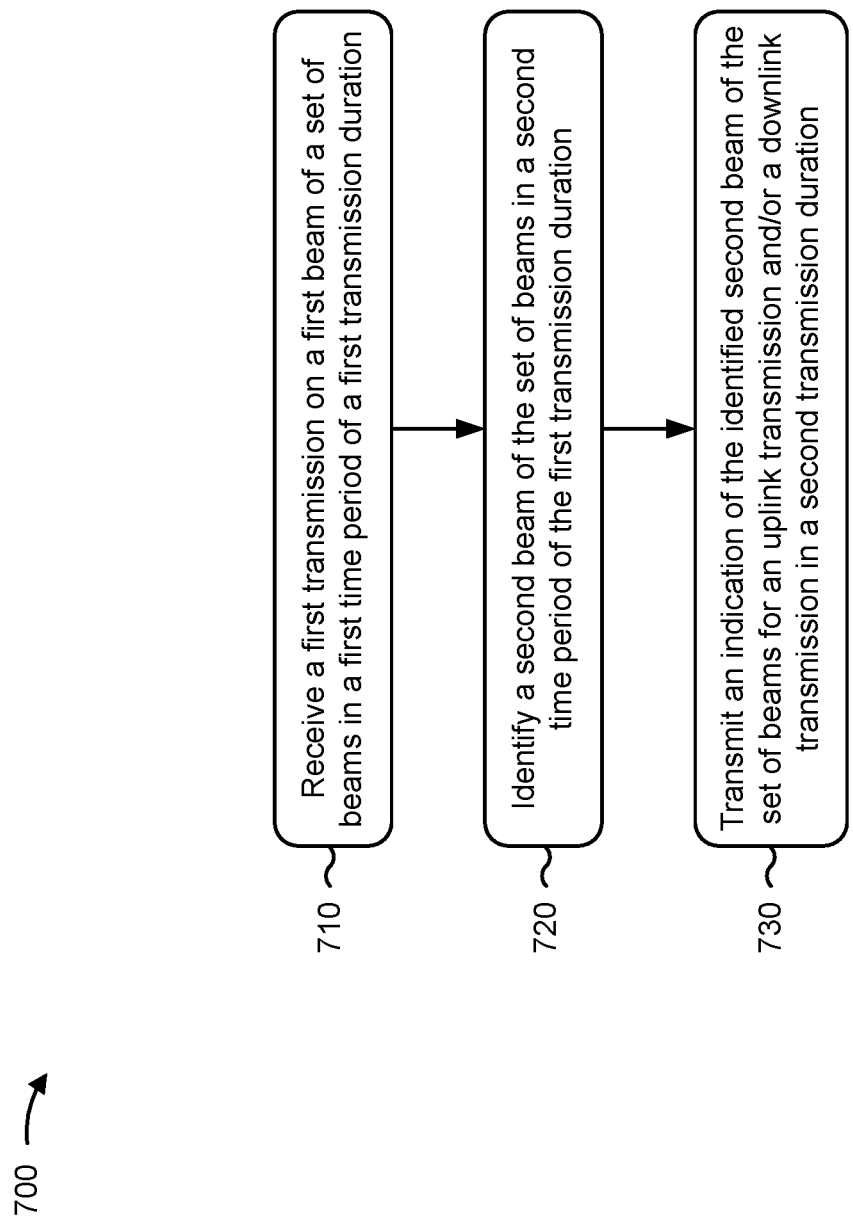
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with signaling a beam for periodic communications.

As shown in FIG. 7, in some aspects, process 700 may include receiving a first transmission on a first beam of a set of beams in a first time period of a first transmission duration (block 710). For example, the UE (e.g., using receive processor 258, controller/processor 280, memory 282, and/or the like) may receive a first transmission on a first beam of a set of beams in a first time period of a first transmission duration, as described above.

As further shown in FIG. 7, in some aspects, process 700 may include identifying a second beam of the set of beams in a second time period of the first transmission duration (block 720). For example, the UE (e.g., using receive processor 258, transmit processor 264, controller/processor 280, memory 282, and/or the like) may identify a second beam of the set of beams in a second time period of the first transmission duration, as described above.

As further shown in FIG. 7, in some aspects, process 700 may include transmitting an indication of the identified second beam of the set of beams for an uplink transmission and/or a downlink transmission in a second transmission duration (block 730). For example, the UE (e.g., transmit processor 264, controller/processor 280, memory 282, and/or the like) may transmit an indication of the identified second beam of the set of beams for an uplink transmission and/or a downlink transmission in a second transmission duration, as described above.

Process 700 may include additional aspects, such as any single aspect or any combination of aspects described below and/or in connection with one or more other processes described elsewhere herein.

In a first aspect, the set of beams are used to receive a set of retransmissions in the second time period based at least in part on indicating that the first transmission failed.

In a second aspect, alone or in combination with the first aspect, indicating that the first transmission failed includes transmitting a NACK corresponding to the first transmission or refraining from transmitting an ACK or NACK feedback corresponding to the first transmission.

In a third aspect, alone or in combination with one or more of the first and second aspects, the first transmission duration and the second transmission duration are configured according to a periodicity associated with a semi-persistent scheduling configuration or a configured grant configuration.

In a fourth aspect, alone or in combination with one or more of the first through third aspects, the first time period is an initial transmission window and the second time period is a retransmission window.

In a fifth aspect, alone or in combination with one or more of the first through fourth aspects, the second beam is a same beam as the first beam.

In a sixth aspect, alone or in combination with one or more of the first through fifth aspects, the second beam is a different beam than the first beam.

In a seventh aspect, alone or in combination with one or more of the first through sixth aspects, the indication identifies the second beam using a reference signal identifier associated with the second beam.

In an eighth aspect, alone or in combination with one or more of the first through seventh aspects, the indication excludes a reference signal received power parameter associated with the second beam.

In a ninth aspect, alone or in combination with one or more of the first through eighth aspects, the indication includes a reserved value, in a reference signal received power parameter field, indicating that the second beam is to be used for the uplink transmission and/or the downlink transmission in the second transmission duration.

In a tenth aspect, alone or in combination with one or more of the first through ninth aspects, the indication identifies the second beam using at least one of: a control resource set identifier associated with the second beam, a transmission configuration indication state identifier associated with the second beam, a spatial relation information identifier associated with the second beam, a sounding reference signal resource indicator associated with the second beam, or a combination thereof.

In an eleventh aspect, alone or in combination with one or more of the first through tenth aspects, the indication identifies the second beam using an index that maps to at least one of: a reference signal identifier associated with the second beam, a control resource set identifier associated with the second beam, a transmission configuration indication state identifier associated with the second beam, or a combination thereof.

In a twelfth aspect, alone or in combination with one or more of the first through eleventh aspects, the second beam is a downlink beam for the downlink transmission, and the indication further identifies an uplink beam for the uplink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
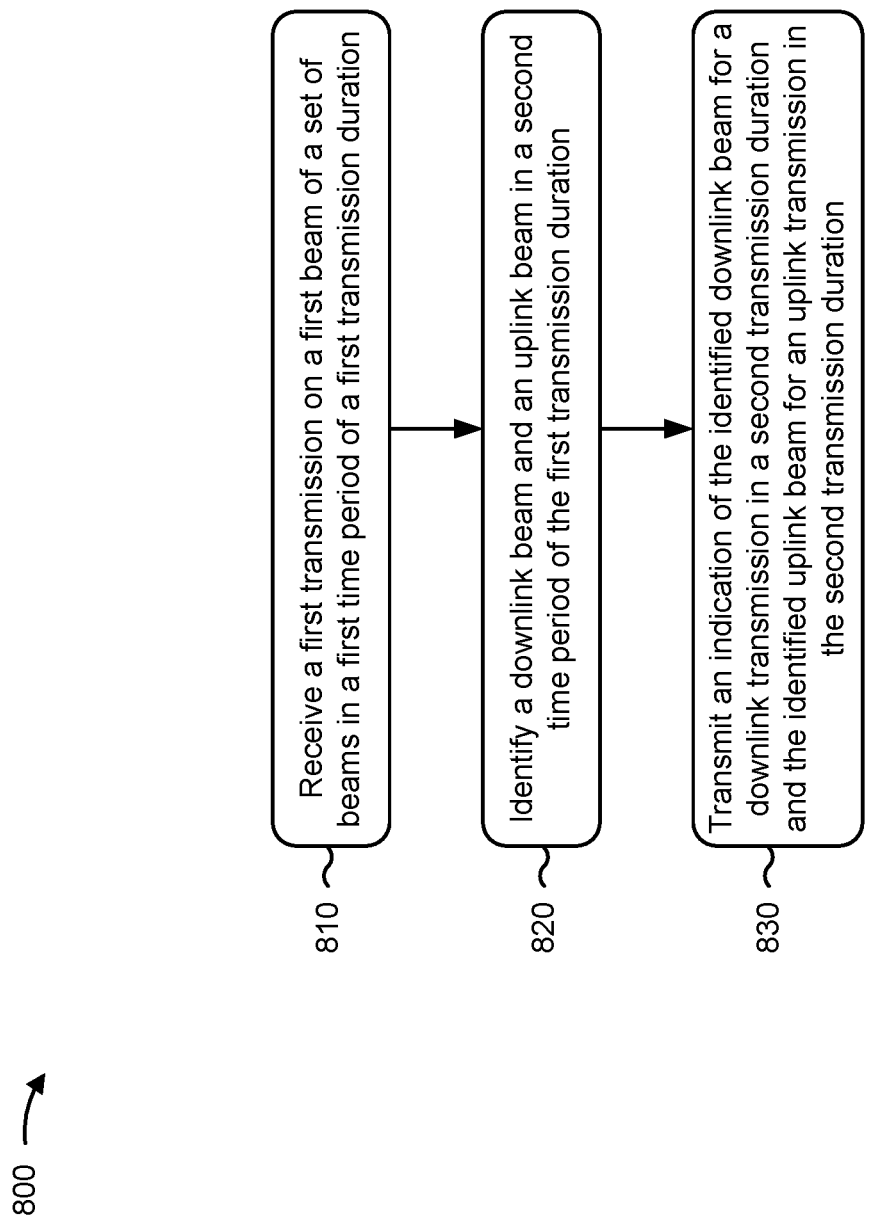
FIG. 8 is a diagram illustrating another example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with signaling a beam for periodic communications.

As shown in FIG. 8, in some aspects, process 800 may include receiving a first transmission on a first beam of a set of beams in a first time period of a first transmission duration (block 810). For example, the UE (e.g., using receive processor 258, controller/processor 280, memory 282, and/or the like) may receive a first transmission on a first beam of a set of beams in a first time period of a first transmission duration, as described above.

As further shown in FIG. 8, in some aspects, process 800 may include identifying a downlink beam and an uplink beam in a second time period of the first transmission duration (block 820). For example, the UE (e.g., using receive processor 258, transmit processor 264, controller/processor 280, memory 282, and/or the like) may identify a downlink beam and an uplink beam in a second time period of the first transmission duration, as described above.

As further shown in FIG. 8, in some aspects, process 800 may include transmitting an indication of the identified downlink beam for a downlink transmission in a second transmission duration and the identified uplink beam for an uplink transmission in the second transmission duration (block 830). For example, the UE (e.g., using transmit processor 264, controller/processor 280, memory 282, and/or the like) may transmit an indication of the identified downlink beam for a downlink transmission in a second transmission duration and the identified uplink beam for an uplink transmission in the second transmission duration, as described above.

Process 800 may include additional aspects, such as any single aspect or any combination of aspects described below and/or in connection with one or more other processes described elsewhere herein.

In a first aspect, the set of beams are used to receive a set of retransmissions in the second time period based at least in part on indicating that the first transmission failed.

In a second aspect, alone or in combination with the first aspect, indicating that the first transmission failed includes transmitting a NACK corresponding to the first transmission or refraining from transmitting an ACK or NACK feedback corresponding to the first transmission.

In a third aspect, alone or in combination with one or more of the first and second aspects, the first transmission duration and the second transmission duration are configured according to a periodicity associated with a semi-persistent scheduling configuration or a configured grant configuration.

In a fourth aspect, alone or in combination with one or more of the first through third aspects, the first time period is an initial transmission window and the second time period is a retransmission window.

In a fifth aspect, alone or in combination with one or more of the first through fourth aspects, at least one of the downlink beam or the uplink beam is a same beam as the first beam.

In a sixth aspect, alone or in combination with one or more of the first through fifth aspects, at least one of the downlink beam or the uplink beam is a different beam than the first beam.

In a seventh aspect, alone or in combination with one or more of the first through sixth aspects, the indication is transmitted in at least one of uplink control information, a MAC-CE, or a combination thereof.

In an eighth aspect, alone or in combination with one or more of the first through seventh aspects, the indication identifies at least one of a set of downlink beams that includes the downlink beam or a set of uplink beams that includes the uplink beam.

In a ninth aspect, alone or in combination with one or more of the first through eighth aspects, process 800 includes indicating a beam-sweeping pattern to be used for the set of downlink beams or the set of uplink beams.

In a tenth aspect, alone or in combination with one or more of the first through ninth aspects, the beam-sweeping pattern includes at least one of a time-division multiplexing pattern, a frequency-division multiplexing pattern, a spatial-division multiplexing pattern, or a combination thereof.

In an eleventh aspect, alone or in combination with one or more of the first through tenth aspects, process 800 includes indicating a channel for which at least one of the downlink beam or the uplink beam is to be used.

In a twelfth aspect, alone or in combination with one or more of the first through eleventh aspects, process 800 includes indicating at least one of a semi-persistent scheduling configuration or a configured grant configuration for which at least one of the downlink beam or the uplink beam is to be used.

In a thirteenth aspect, alone or in combination with one or more of the first through twelfth aspects, the downlink beam and the uplink beam are explicitly indicated in a signaling message.

In a fourteenth aspect, alone or in combination with one or more of the first through thirteenth aspects, the downlink beam is explicitly indicated in a signaling message and the uplink beam is implicitly indicated.

In a fifteenth aspect, alone or in combination with one or more of the first through fourteenth aspects, the uplink beam is indicated by transmitting the indication on a physical uplink control channel resource that indicates the uplink beam.

In a sixteenth aspect, alone or in combination with one or more of the first through fifteenth aspects, the downlink beam is indicated by transmitting the indication on a physical uplink control channel resource that indicates the downlink beam.

In a seventeenth aspect, alone or in combination with one or more of the first through sixteenth aspects, at least one of the uplink beam or the downlink beam is indicated using at least one of: a reference signal identifier, an index that maps to the reference signal identifier, a control resource set identifier, an index that maps to the control resource set identifier, a transmission configuration indication state identifier, an index that maps to the transmission configuration indication state identifier, a spatial relation information identifier, an index that maps to the spatial relation information identifier, a sounding reference signal resource indicator, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
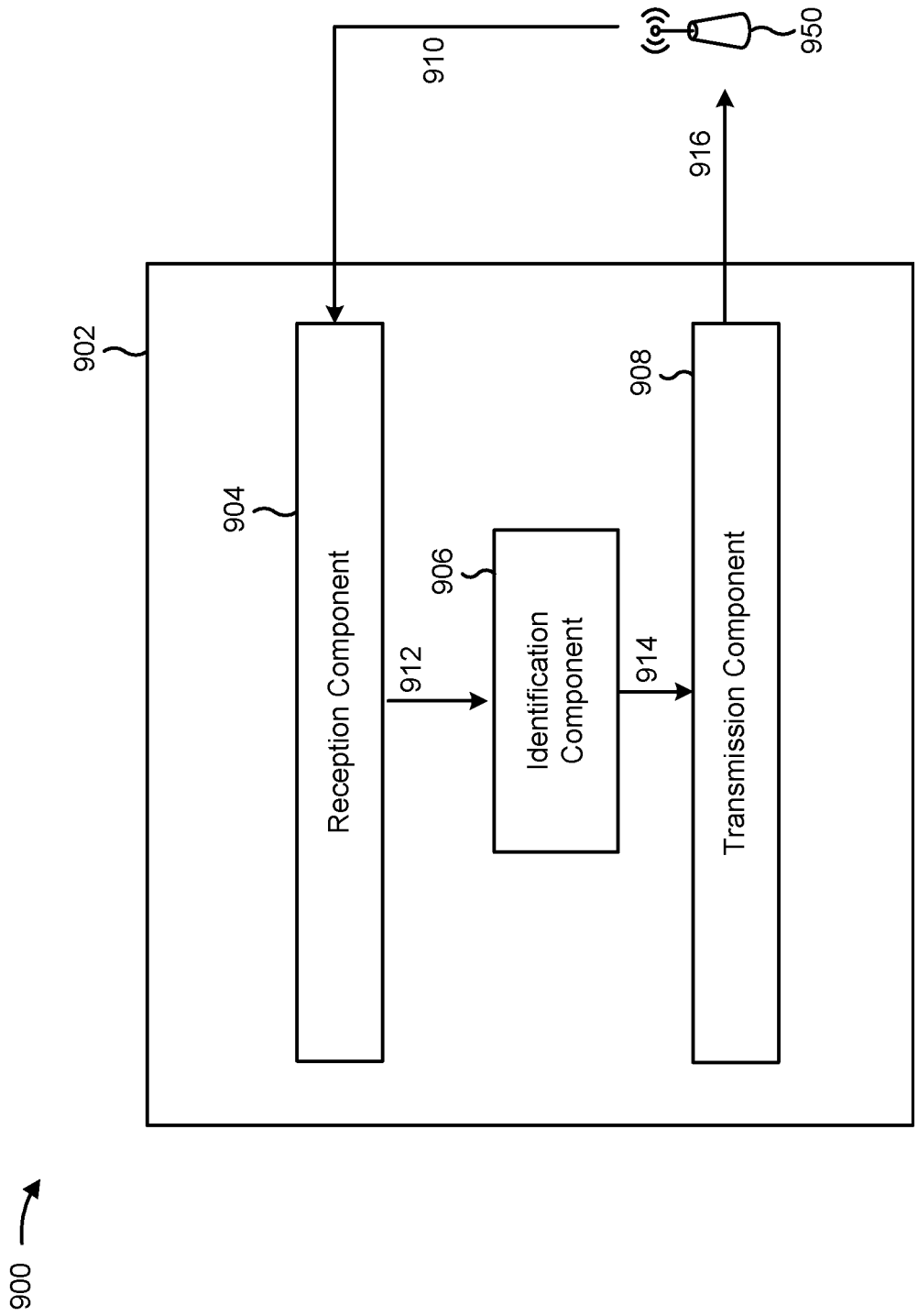
FIG. 9 is a conceptual data flow diagram illustrating a data flow between different modules/means/components in an example apparatus, in accordance with various aspects of the present disclosure.

FIG. 9 is a conceptual data flow diagram 900 illustrating a data flow between different modules/means/components in an example apparatus 902. The apparatus 902 may be a UE (e.g., UE 120). In some aspects, the apparatus 902 includes a reception component 904, an identification component 906, and/or a transmission component 908.

The reception component 904 may receive, as a signal 910 from an apparatus 950 (e.g., a base station 110), a first transmission on a first beam of a set of beams in a first time period of a first transmission duration. Additionally, or alternatively, the reception component 904 may receive, as signal(s) 910, retransmissions on the set of beams in a second time period of the first transmission duration. The reception component 904 may provide information regarding the set of beams (e.g., one or more beam parameters and/or measurements) to the identification component 906 as information 912. In some aspects, the identification component 906 may use the information 912 and/or perform beam measurements to identify a second beam of the set of beams in a second time period of the first transmission duration. Additionally, or alternatively, the identification component 906 may use the information 912 and/or perform beam measurements to identify a downlink beam and an uplink beam in a second time period of the first transmission duration. The identification component 906 may provide information that identifies the second beam, the downlink beam, and/or the uplink beam to the transmission component 908 as information 914. The transmission component 908 may transmit, to the apparatus 950 as a signal 916, an indication of the identified second beam, the identified uplink beam, and/or the identified downlink beam for an uplink transmission and/or a downlink transmission in a second transmission duration.

The apparatus 902 may include additional components that perform each of the blocks of the algorithm in the aforementioned process 700 of FIG. 7, process 800 of FIG. 8, and/or the like. Each block in the aforementioned process 700 of FIG. 7, process 800 of FIG. 8, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
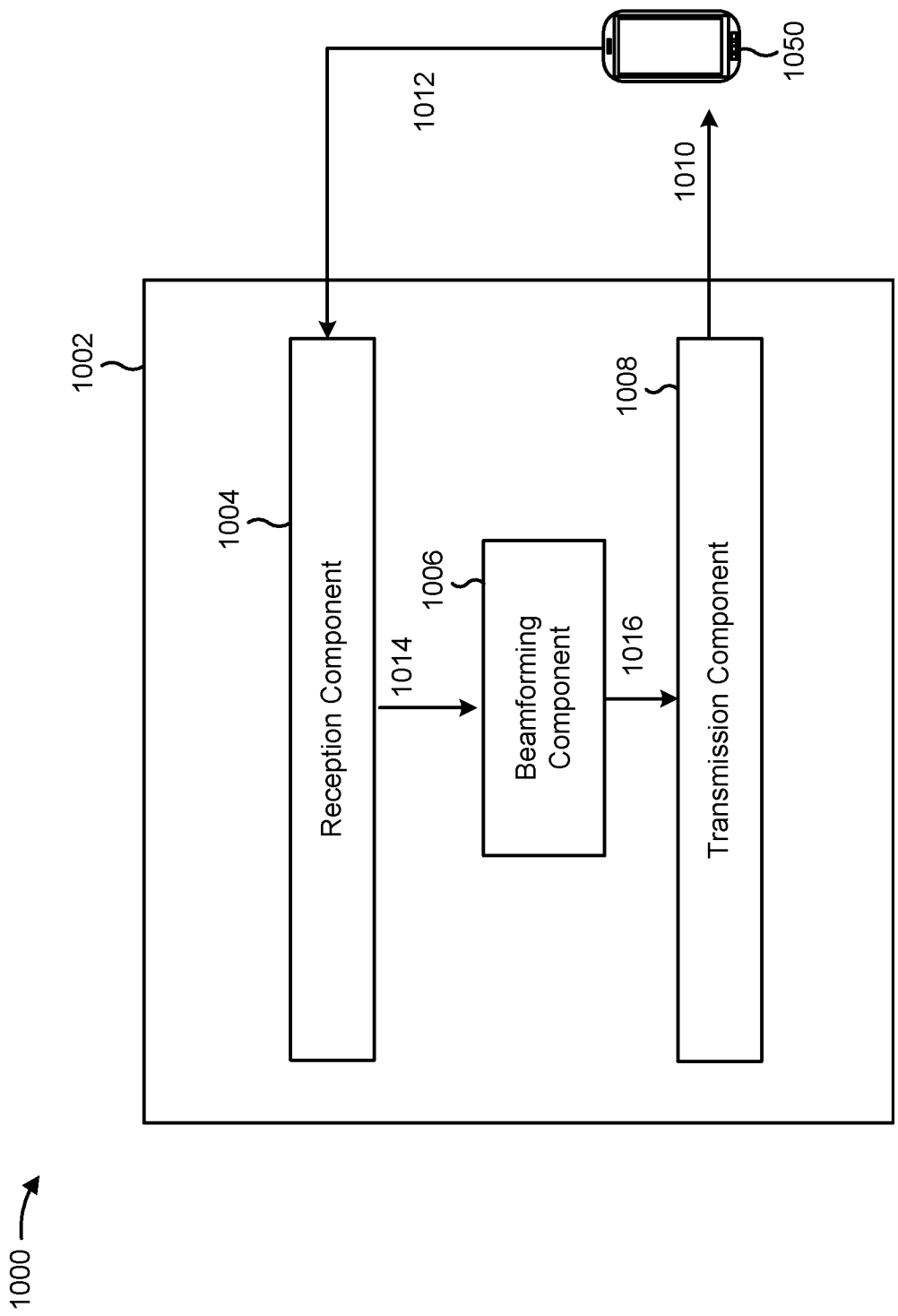
FIG. 10 is a conceptual data flow diagram illustrating a data flow between different modules/means/components in another example apparatus, in accordance with various aspects of the present disclosure.

FIG. 10 is a conceptual data flow diagram 1000 illustrating a data flow between different modules/means/components in an example apparatus 1002. The apparatus 1002 may be a base station (e.g., base station 110). In some aspects, the apparatus 1002 includes a reception component 1004, a beamforming component 1006, and/or a transmission component 1008.

The transmission component 1008 may transmit, as a signal 1010 to an apparatus 1050 (e.g., a UE 120), a first transmission on a first beam of a set of beams in a first time period of a first transmission duration. Additionally, or alternatively, the transmission component 1008 may transmit, as signal(s) 1010, retransmissions on the set of beams in a second time period of the first transmission duration. The reception component 1004 may receive, from the apparatus 1050 as a signal 1012, an indication of a second beam, an uplink beam, and/or a downlink beam for an uplink transmission and/or a downlink transmission in a second transmission duration. The reception component 1004 may provide information regarding the second beam, the uplink beam, and/or the downlink beam (e.g., one or more beam parameters, a beam index, and/or the like) to the beamforming component 1006 as information 1014. In some aspects, the beamforming component 1006 may use the information 1014 to beamform transmissions in the second transmission duration, such as by using beamforming parameters. The beamforming component 1006 may provide the beamforming parameters to the transmission component 1008 as information 1016. The transmission component may transmit a downlink transmission in a second transmission duration to the apparatus 1050 as a signal 1010.

The apparatus 1002 may include components that perform one or more operations described herein as being performed by a base station 110 (e.g., in connection with FIGS. 1-6). The components may be one or more hardware components specifically configured to carry out the stated operations, implemented by a processor configured to perform the stated operations, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a first transmission on a first beam of a set of beams in a first time period of a first transmission duration;
identifying a second beam of the set of beams in a second time period of the first transmission duration; and
transmitting, by the UE, an indication of the second beam for an uplink transmission and/or a downlink transmission in a second transmission duration, wherein the indication identifies the second beam using an index that maps to a transmission configuration indication (TCI) state identifier associated with the second beam.

2. The method of claim 1, wherein the set of beams are used to receive a set of retransmissions in the second time period based at least in part on indicating that the first transmission failed.

3. The method of claim 2, wherein indicating that the first transmission failed includes transmitting a negative acknowledgement (NACK) corresponding to the first transmission or refraining from transmitting an acknowledgement (ACK) or NACK feedback corresponding to the first transmission.

4. The method of claim 1, wherein the first transmission duration and the second transmission duration are configured according to a periodicity associated with a semi-persistent scheduling configuration or a configured grant configuration.

5. The method of claim 1, wherein the first time period is an initial transmission window and the second time period is a retransmission window.

6. The method of claim 1, wherein the second beam is a same beam as the first beam.

7. The method of claim 1, wherein the second beam is a different beam than the first beam.

8. The method of claim 1, wherein the indication identifies the second beam using a reference signal identifier associated with the second beam.

9. The method of claim 8, wherein the indication excludes a reference signal received power parameter associated with the second beam.

10. The method of claim 8, wherein the indication includes a reserved value, in a reference signal received power parameter field, indicating that the second beam is to be used for the uplink transmission and/or the downlink transmission in the second transmission duration.

11. The method of claim 1, wherein the indication identifies the second beam further using at least one of:
a spatial relation information identifier associated with the second beam, or
a sounding reference signal resource indicator associated with the second beam.

12. The method of claim 1, wherein the second beam is a downlink beam for the downlink transmission, and wherein the indication further identifies an uplink beam for the uplink transmission.

13. A method of wireless communication performed by a user equipment (UE), comprising:
receiving a first transmission on a first beam of a set of beams in a first time period of a first transmission duration;
identifying a downlink beam and an uplink beam in a second time period of the first transmission duration; and
transmitting, by the UE, an indication of the downlink beam for a downlink transmission in a second transmission duration and the uplink beam for an uplink transmission in the second transmission duration, wherein at least one of the uplink beam or the downlink beam is indicated using an index that maps to a transmission configuration indication (TCI) state identifier.

14. The method of claim 13, wherein the set of beams are used to receive a set of retransmissions in the second time period based at least in part on indicating that the first transmission failed.

15. The method of claim 14, wherein indicating that the first transmission failed includes transmitting a negative acknowledgement (NACK) corresponding to the first transmission or refraining from transmitting an acknowledgement (ACK) or NACK feedback corresponding to the first transmission.

16. The method of claim 13, wherein the first transmission duration and the second transmission duration are configured according to a periodicity associated with a semi-persistent scheduling configuration or a configured grant configuration.

17. The method of claim 13, wherein the first time period is an initial transmission window and the second time period is a retransmission window.

18. The method of claim 13, wherein at least one of the downlink beam or the uplink beam is a same beam as the first beam.

19. The method of claim 13, wherein at least one of the downlink beam or the uplink beam is a different beam than the first beam.

20. The method of claim 13, wherein the indication is transmitted in at least one of uplink control information, a media access control (MAC) control element, or a combination thereof.

21. The method of claim 13, wherein the indication identifies at least one of a set of downlink beams that includes the downlink beam or a set of uplink beams that includes the uplink beam.

22. The method of claim 21, further comprising indicating a beam-sweeping pattern to be used for the set of downlink beams or the set of uplink beams.

23. The method of claim 13, further comprising indicating at least one of:
a channel for which at least one of the downlink beam or the uplink beam is to be used,
a semi-persistent scheduling configuration for which at least one of the downlink beam or the uplink beam is to be used,
a configured grant configuration for which at least one of the downlink beam or the uplink beam is to be used, or
a combination thereof.

24. The method of claim 13, wherein the downlink beam and the uplink beam are explicitly indicated in a signaling message.

25. The method of claim 13, wherein the downlink beam is explicitly indicated in a signaling message and the uplink beam is implicitly indicated.

26. The method of claim 13, wherein at least one of the uplink beam or the downlink beam is indicated by transmitting the indication on a physical uplink control channel resource that indicates at least one of the uplink beam or the downlink beam.

27. The method of claim 13, wherein at least one of the uplink beam or the downlink beam is indicated further using at least one of:
- a reference signal identifier,
- an index that maps to the reference signal identifier,
- a spatial relation information identifier,
- an index that maps to the spatial relation information identifier, or
- a sounding reference signal resource indicator.

28. A user equipment (UE) for wireless communication, comprising:
- a memory; and
- one or more processors, coupled to the memory, configured to cause the UE to:
  - receive a first transmission on a first beam of a set of beams in a first time period of a first transmission duration;
  - identify a second beam of the set of beams in a second time period of the first transmission duration; and
  - transmit an indication of the second beam of the set of beams for an uplink transmission and/or a downlink transmission in a second transmission duration, wherein the indication identifies the second beam using an index that maps to a transmission configuration indication (TCI) state identifier associated with the second beam.

29. A user equipment (UE) for wireless communication, comprising:
- a memory; and
- one or more processors, coupled to the memory, configured to cause the UE to:
  - receive a first transmission on a first beam of a set of beams in a first time period of a first transmission duration;
  - identify a downlink beam and an uplink beam in a second time period of the first transmission duration; and
  - transmit an indication of the downlink beam for a downlink transmission in a second transmission duration and the uplink beam for an uplink transmission in the second transmission duration, wherein at least one of the uplink beam or the downlink beam is indicated using an index that maps to a transmission configuration indication (TCI) state identifier.

30. The UE of claim 29, wherein the set of beams are used to receive a set of retransmissions in the second time period based at least in part on indicating that the first transmission failed.

* * * * *